Patented Aug. 7, 1951

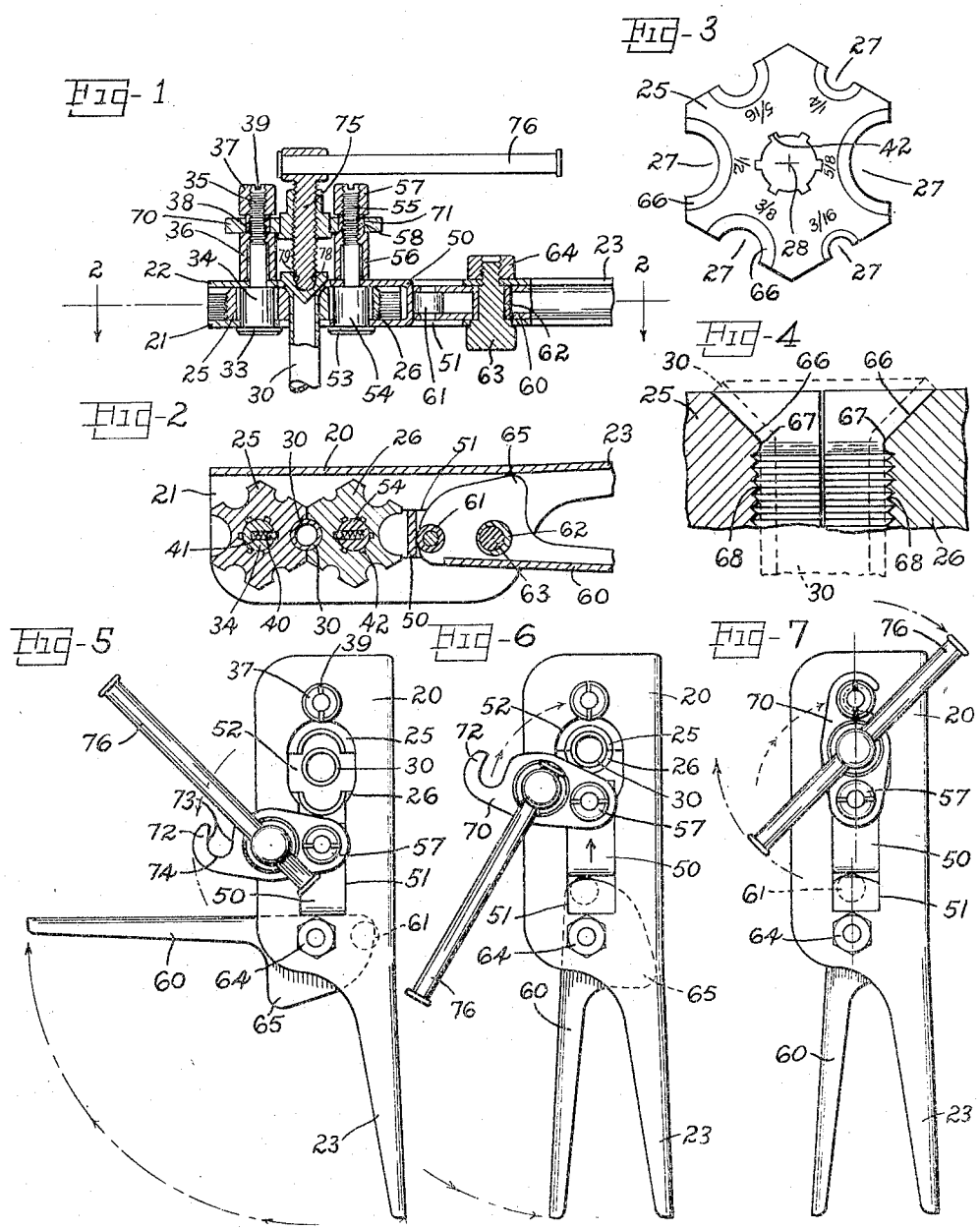

2,563,088

UNITED STATES PATENT OFFICE 2,563,088

FLARING TOOL

Karl W. Wilks, Jr., and Glenn W. Wolcott, Dayton, Ohio, assignors to Penn Aircraft Products, Incorporated, Dayton, Ohio, a corporation of Ohio Application June 28, 1946, Serial No. 680,168

10 Claims. (Cl. 153—79)

This invention relates to tools for flaring the ends of tubing and the like.

One of the principal objects of the invention is to provide a flaring tool of simple, rugged and unitary construction having the flaring mechanism operatively connected with the clamping portion of the tool.

An additional object is to provide a flaring tool of such construction that the flaring mechanism cannot be operated unless the material to be flared is properly clamped and centered in the clamping portion of the tool.

It is a further object of the invention to provide a flaring tool which will positively lock in clamped position to apply a predetermined clamping pressure opposite the center line of the material to be flared.

Other objects and advantages of the invention will be apparent from the following description, the accompanying drawing and the appended claims.

In the drawing, in which like characters of reference designate like parts throughout—

Fig. 1 is a view in longitudinal section of a flaring tool constructed in accordance with the invention;

Fig. 2 is a section on the line 2—2 in Fig. 1;

Fig. 3 is an enlarged view in elevation of one of the clamping members of the tool shown in Figs. 1 and 2;

Fig. 4 is an enlarged fragmentary view illustrating details of the construction and operation of the clamping members;

Fig. 5 is a plan view illustrating the operation of the tool shown in Fig. 1, the view showing the tool prior to clamping a tube therein for flaring;

Fig. 6 is a view similar to Fig. 5 showing the tube clamped in position but with the flaring mechanism not yet in operative position; and Fig. 7 is a view similar to views 5 and 6 illustrating the tool completely ready for operation.

The present invention provides a flaring tool which may be used readily and effectively for providing a flared end on tubing or pipe, and which is of unitary construction, with the flaring mechanism operatively connected with the mechanism for clamping tubing in position for the flaring operation. This clamping mechanism is constructed for easy operation with one hand of the user and includes means automatically locking it in clamped position such that accidental release of the clamping mechanism is substantially prevented. The flaring mechanism is so constructed and connected with the clamping mechanism that is also acts to lock the latter in clamping position and cannot be operated unless it is in properly centered relation with the clamped tubing. The individual clamping members of the clamping mechanism are provided with a plurality of complementary jaws of different sizes which are readily adjusted to properly cooperating relation, and the invention also provides positive indexing means facilitating this adjustment.

In the preferred embodiment of the invention shown in the drawing, the main body 20 of the tool is shown as formed of a single piece of suitable metal shaped to provide a deep channeled construction having a lower flat 21 and an upper flat face 22, and it includes an integral handle portion 23 extending out at one end. Two complementary clamping members 25 and 26 are mounted in body 20 for relative sliding movement into and out of clamping relation, one of these clamping members being illustrated in detail in Fig. 3. As shown, this clamping member is hexagonal in shape and is provided along each straight side with a semi-cylindrical cut-out portion 27 forming a clamping jaw, the centers of each of these jaws being symmetrically positioned with respect to the center 28 of the clamping member. Each of these jaws 27 is of a different size, the diameter thereof being preferably clearly marked on the upper surface of the clamping member as shown in Fig. 3, to provide for receiving tubes of different diameter, one such tube being shown at 30.

The clamp member 25 is mounted in body 20 means of bolt 33 for rotation about a stationary axis coinciding with the center 28 of symmetry of the clamp jaws 27. This bolt 33 includes a cylindrical portion 34 about which clamp member 25 rotates, and a portion 35 of reduced diameter having at least its outer end threaded as shown. The bolt portion 34 engages in a hole in lower body face 21, and the smaller bolt portion 35 engages in a similarly smaller hole in upper body face 22 as shown. Also bolt portion 34 may be proportioned just sufficiently longer, for example, 0.1 inch, than the thickness of clamp member 25 to give clearance for the clamp member, thus providing support for bolt 33 closely adjacent each side of the clamp member to maintain its alignment and prevent its axis from tilting while permitting ready rotational adjustment of the clamp member to present in clamping position a jaw 27 of the proper size for the tube to be clamped. A sleeve 36 is threaded on the threaded portion 35 of bolt 33 and held in position by a lock nut 37, which is shown as cylindrical and provided with a suitable kerf 39 to receive a screwdriver for tightening or removal. The outer end of sleeve 36 includes a portion 38 of reduced diameter with respect to the remainder of the sleeve, this portion serving to aid in mounting the flaring mechanism of the tool as will be described.

Indexing means for clamp member 25 are provided and are shown as comprising a spring and ball detent mechanism 40 received within a bore 41 in bolt portion 34 and adapted for engagement in a series of slots 42 in the sides of the central aperture of clamp member 25 as shown in Figs. 2 and 3, these slots 42 being accurately positioned radially with respect to the center 28 of symmetry of the clamp member and the centers of the clamping jaws 27. With this positioning of the slots 42, the detent mechanism will operate to stop the clamp member with each of its clamping jaws successively in proper position for accurate registry with the adjacent jaw portion of the clamp member 26, and the invention also provides means for accurately positioning bolt 33 to bring about this operation of the detent. For example, bolt 33 may be provided with a kerf accurately parallel with bore 41, and with this construction, it is merely necessary in assembling the tool to arrange bolt 33 with this kerf parallel to the length of body 20. Similar results may be obtained by a variety of other expedients, such for example as a key holding bolt 33 in the desired fixed relation with respect to body 20.

The clamp member 26 is identical in construction with clamp member 25 as described, and it is mounted in body 20 for sliding movement toward and away from clamping relation with clamp member 25. The mounting mechanism for clamp member 25 includes a yoke 50 having substantially the same thickness as body 20 and engaging in slots 51 in each side of the channeled part of body 20, these slots being accurately formed to center and guide the yoke. Each of these slots terminates in an enlarged portion 52, best seen in Fig. 5, through which the tubing 30 to be flared is inserted. The mounting means for clamp member 26 in yoke 50 is substantially the same as the mounting means for clamp member 25 in body 20, and includes a similar bolt 53 having a cylindrical portion 54 and a threaded portion 55 of reduced diameter. The sleeve 56 is similar to sleeve 36 and is similarly threaded on bolt 53 and provided with a locking nut 57 and an end portion 58 of reduced diameter. Since clamp member 26 is wider, as shown, than the slots 51 and 52 and since yoke 50 is held and guided as described in slots 51, this construction provides for ready sliding movement of clamp member 26 into and out of clamping relation with clamp member 25 and also for supporting bolt 53 adjacent each side of clamp member 23 to prevent axial tilting as described in connection with clamp member 25. Clamp member 26 is also provided with indexing means shown in Fig. 2 as comprising a detent mechanism substantially identical with the similar mechanism described for clamp member 25 and which is accordingly believed to require no further description. It will be seen that these detent mechanisms cooperate to stop each of the clamp members with their adjacent clamping jaws in accurate relative register to clamp tubing therebetween.

In order to provide for controlling the sliding movement of the sliding clamp member 26 and to urge it into the desired clamping relation with its complementary clamp member 25, a lever 60 is pivotally mounted in body 20. This lever is similar in construction to body 20 but of sufficiently less thickness to fit within the channeled portion of the body. At its inner end lever 60 is provided with a pivoted roller member 61 adapted for engagement with the yoke 50 and so positioned that when lever 60 is moved about its pivotal mounting towards the handle portion 23 on body 20, roller 61 will be brought into contact with yoke 50 and force it to slide and to carry with it clamp member 26 into clamping relation with clamp member 25. This construction provides for ready operation of the clamp mechanism by one hand, since the lever 60 and handle 23 form plier-like handles, and it also minimizes abrasive frictional contact between the end of the lever and yoke 50. The invention also provides for varying the pressure exerted on yoke 50 by the lever. As shown, lever 60 pivots on a sleeve 62 which is in turn eccentrically mounted on bolt 63, which traverses body 20 and is provided with a suitable lock nut 64. This sleeve and bolt thus serve as a cam which may be adjusted to move the pivotal axis of lever 60 towards or away from the fixed pivotal axis of clamp member 25, this adjustment being facilitated by press-fitting the sleeve 62 on bolt 63 so that turning the bolt will cause the sleeve to rotate.

The invention also provides means for automatically locking the clamp members in clamping relation, and this result is accomplished by so constructing and mounting lever 60 that the lever is permitted limited movement beyond the point in its rotation at which the two clamp members 25 and 26 are brought into clamping relation, thus wedging all these portions of the clamping mechanism tightly together. As shown, the distance between the centers of the holes in body 20 for bolt 33 and bolt 63, as measured along a line connecting the axes of bolts 33 and 63, is less than the similarly measured distance from the axis of bolt 33 to the outer end of yoke 50 which engages roller 61 plus the radius of this roller and the distance from its axis to the axis of sleeve 62. With this construction, when lever 60 is moved about sleeve 62 towards handle 23 on the body, the clamp members 25 and 26 will engage each other before the lever reaches its dead center position, but the lever is then permitted further limited pivotal movement until the projecting portion 65 thereon strikes the side wall of body 20 as shown in Figs. 2 and 6. This further movement of the lever is facilitated by the use of the anti-friction roller 61 and results in firmly locking these parts in a manner analogous to the locking action of a toggle joint. Also, since the action of the lever is transferred through yoke 50 to the axis of symmetry of the clamp member 26, this will cause the clamping pressure to be applied between the two clamp members 25 and 26 in substantially direct line with their pivotal axes and the center of tube 30.

The construction and operation of the individual clamping jaws 27 is illustrated in detail in Fig. 4. As shown, the upper end of each clamping jaw is chamfered at 66 at a suitable angle to the axis of the jaw, for example 45°. The remaining cylindrical portion of each clamping jaw is provided with a series of annular teeth, the uppermost tooth 67 being rounded and the remaining teeth 68 being ground to a relatively sharp joint for suitably gripping the tube material to be flared. This construction provides for a uniform and circular junction between the flared and circular portions of the tube operated on by the tool, which is indicated in dotted lines at 30 in Fig. 4, a result which cannot be obtained with spiral teeth such as have heretofore been used in flaring tools. Also, the rounded tooth 67 provides for rounding this junction on the tube instead of a sharp junction such as results if the top tooth in the clamp jaw is sharp, which makes for a substantial increase of strength at this point on the tube. Satisfactory results have been obtained with this uppermost tooth 67 rounded about a radius of the order of $\frac{1}{32}''$.

The flaring mechanism is carried by and operatively connected with the above described clamping portion of the tool and is best seen in Figs. 1 and 5 to 7. A strap 70 of steel or other suitable material is provided adjacent one end with a circular hole 71 adapted to receive the reduced end 58 of sleeve 56, the diameter of this hole 71 being sufficiently large and the sleeve end 58 being of sufficient axial length to provide for free swiveling movement of the strap thereon without frictional contact with nut 57. The opposite end of strap 70 is formed to provide a hook portion 72 adapted to engage the corresponding reduced portion 38 of sleeve 36, the sides of the slot 73 at this hook portion 72 being curved about the center of the hole 71 at the opposite end of the strap which receives sleeve portion 58. The inner end 74 of slot 72 is circularly curved about the same radius as hole 71 to receive sleeve portion 38, and the distance from the center of curvature of slot portion 74 to the center of the hole 71 is substantially equal to the distance between the centers of symmetry of the two clamp members 25 and 26 when the latter are in clamping relation. A screw 75 is threaded through strap 70 with its axis accurately equidistant from the centers of curvature of slot portion 74 and hole 71 and in substantially direct line therebetween, and a handle rod 76 is mounted in the T-shaped upper end of screw 75. A conical flaring member 77 is secured to the lower end of the shaft, and satisfactory results have been obtained by providing flaring member 77 with a swivel connection to shaft 75, as by forming an annular groove 78 adjacent the lower end of screw 75 which receives a dowel pin 79 driven through the flaring member as shown.

The operation of this tool is shown clearly in Figs. 1 and 5 to 7. The clamp members 25 and 26 are first adjusted in accordance with the diameter of the tube to be flared so that clamping jaws of the corresponding diameter are in the proper face to face relation, and the tube is then inserted as shown in Fig. 5. Lever 60 is then operated as described to clamp the tube in place for flaring, this position of all the parts being shown in Fig. 6 and the clamping portion of the clamp members being shown in detail in Fig. 4. Strap 70 is then swiveled about sleeve 56 so that its hook portion 72 locks over the reduced end portion 38 of sleeve 36 as shown in Fig. 7, and with the parts in this position it is merely necessary to turn screw 75 by means of handle 76 and thereby to force the flaring member 77 into tube 30 to produce the desired flare as shown in Fig. 1.

The above tool offers substantial advantages in use in addition to the easy and positive operation of the improved clamping mechanism as described. The flaring mechanism of the tool is at all times attached thereto and ready for immediate use, and the connection between the flaring mechanism and the clamping mechanism not only includes means for locking the clamping mechanism, which locking is in addition to the locking by means of lever 60 as described, but it also insures automatic centering of the flaring member with respect to the tubing to be flared and prevents operation of the flaring mechanism unless the tool is properly centered. The construction of the tool with the underside thereof substantially flush permits the production of close flares on even very short tubes, which is an important advantage for flaring or tubing already installed, such for example as is commonly necessary with refrigeration apparatus.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A flaring tool of the character described comprising, in combination, a body member, complementary clamping members, means for mounting one of said clamping members on said body for relative bodily movement to and from clamping position with relation to the other of said members, a flaring member, and means for mounting said flaring member for movement with said movable clamping member.

2. A flaring tool of the character described comprising, in combination, a body member, a clamping member mounted on said body, a complementary clamping member carried by said body, means mounting said complementary clamping member for movement with respect to said body into clamping relation with said first named clamping member, a flaring member, mounting means for said flaring member connected with said complementary clamping member and movable therewith, and means for releasably locking said clamping members in clamping relation.

3. A flaring tool of the character described comprising, in combination, a body member, a pair of clamping members each provided with a plurality of complementary clamping jaws of different sizes, stationary pivot means for one of said clamping members supported by said body adjacent each side of said clamping member and symmetrically positioned with respect to said clamping jaws, pivot means for the other of said clamping members symmetrically positioned with respect to the jaws therein, means slidably mounted in said body for supporting said second named pivot means adjacent each side of the clamping member associated therewith, a flaring member, and mounting means for said flaring member carried by one of said pivots and including means adapted for releasable connection with the other of said pivot means to center said flaring tool with respect to the adjacent clamping jaws of said clamping member.

4. A flaring tool of the character described comprising, in combination, a body member, a clamping member carried by said body and held against linear movement with respect thereto, said clamping member having a plurality of clamping jaws of different sizes and being rotatable in said body member, a complementary clamping member having a similar plurality of clamping jaws of different sizes, means mounting said complementary clamping member for sliding movement in said body into and out of clamping relation with said first named clamping member and supporting said complementary clamping member for pivotal movement to present a matching one of said jaws therein to a selected jaw in the other of said clamping members, a lever for imparting sliding movement to said sliding clamping member to urge said clamping members into clamping relation, a pivot for said lever, and means forming a rotatable eccentric connection between said pivot and said body member for shifting the position of the pivotal axis of said lever in said body member to vary the clamping pressure between said clamping members.

5. A flaring tool of the character described comprising, in combination, a body member, a pair of complementary clamping members each provided with a plurality of complementary clamping jaws of different sizes, means supporting one of said clamping members in said body on a stationary pivot extending through said member, means slidably carried by said body for supporting the other of said clamping members on a pivot extending through said other member, said slidable means including portions engaging said pivot on both sides of said other clamping member, lever means for applying force to said slidable means and thereby to create clamping pressure between said clamping members in substantially direct line with said pivots, and pivot means for said lever supported by said body in predetermined spaced relation with respect to said stationary pivot, said lever being constructed and proportioned for limited pivotal movement beyond its position bringing said clamping members into clamping relation to lock said clamping mechanism.

6. A flaring tool of the character described comprising, in combination, a channeled body member, a clamping member, shaft means traversing said body and providing a pivotal support for said clamping member, a complementary clamping member, supporting means for said second named clamping member slidably mounted in said body and including shaft means pivotally supporting said second named clamp member, a lever pivotally supported in said body for imparting sliding movement to said mounting means to urge said clamping members into clamping relation, a flaring member, and mounting means for said flaring member pivotally secured to one of said shaft means and including means adapted for releasable connection to the other of said shaft means when said clamping members are in clamping position.

7. A flaring tool of the character described comprising, in combination, a channeled body member, a clamping member, shaft means traversing said body and providing a pivotal support for said clamping member, a complementary clamping member, supporting means for said second named clamping member slidably mounted in said body and including shaft means pivotally supporting said second named clamp member, a lever pivotally supported in said body for imparting sliding movement to said mounting means to urge said clamping members into clamping relation, a strap member pivotally supported on one of said shaft means and including a hook portion adapted for releasable connection with the other of said shaft means when said clamping members are in clamping position, a shaft threadedly mounted in said strap member parallel to and intermediate said first named shafts when in said connected position, and a flaring member carried by said threaded shaft for flaring tube material clamped between said clamping members.

8. A flaring tool of the character described, comprising, in combination, a body member, a pair of clamping members having complementary clamping portions, a bolt pivotally securing one of said clamping members to said body, supporting means for the other of said clamping members slidably mounted in said body, a bolt pivotally securing said second named clamp member to said slidable supporting means, means for imparting movement to said slidable supporting means for urging said clamping members into clamping relation, a sleeve threaded on said first named bolt and securing said bolt to said body, a similar sleeve threaded on said second named bolt and securing said bolt to said slidable supporting means, nuts locking said sleeves to said bolts, each of said sleeves having a portion adjacent one end of smaller diameter than the remainder thereof, a strap pivotally mounted on said reduced portion of one of said sleeves and having a hook portion adapted for releasable locking engagement with said reduced portion of said other sleeve, a screw threadedly mounted in said strap member equidistant from said pivotal mounting thereof and said locking portion, and a flaring member carried by said screw for flaring a tube clamped between said clamping members, said strap cooperating with said sleeves and bolts to center said flaring member with respect to the engaged clamping portions of said clamping members.

9. A flaring tool of the character described comprising, in combination, a body member, complementary clamping members positioned within said body, a pair of elongated shaft members extending through said body and forming pivotal supports respectively for each of said clamping members, means for mounting one of said shaft members for relative sliding movement thereof and of the clamping member associated therewith with respect to the other said shaft and clamping member to cause clamping engagement of said clamping members with a tube to be flared, a flaring member, and means carried by said shaft members externally of said body for supporting said flaring member in flaring relation with said clamped tube.

10. A flaring tool of the character described comprising in combination, a body member, complementary clamping members, an elongated bolt mounted in said body member and including a threaded outer end and an unthreaded portion forming a pivot for one of said clamping members, a second elongated bolt including a threaded outer end and an unthreaded portion forming a pivot for the other of said clamping members, means mounting said second named bolt for sliding movement in said body member with respect to said first named bolt to effect relative clamping and unclamping movements of said clamping members, nuts threaded on said threaded portions of said bolts to secure said bolts in fixed axial relation with said body member, a flaring member, a support for said flaring member pivotally mounted on one of said bolts, and means for releasably securing said support to the other said bolt to locate said flaring member in flaring relation with a tube clamped in said clamping members.

KARL W. WILKS, Jr.
GLENN W. WOLCOTT.

(References on following page)

REFERENCES CITED

The following references are of record in the file of this patent:

UNITED STATES PATENTS

| Number | Name | Date |
|---|---|---|
| 836,676 | Frey | Nov. 27, 1906 |
| 864,166 | Herrick | Aug. 27, 1907 |
| 870,828 | Jorgensen | Nov. 12, 1907 |
| 1,350,904 | Walters | Aug. 24, 1920 |
| 1,476,272 | Swanson | Dec. 4, 1923 |
| 1,795,358 | Arndt | Mar. 10, 1931 |
| 1,935,714 | Hummel | Nov. 21, 1933 |
| 1,976,878 | Eden | Oct. 16, 1934 |
| 2,018,832 | Bulmer | Oct. 29, 1935 |
| 2,023,657 | Wilson | Dec. 10, 1935 |
| 2,180,033 | Cattoi | Nov. 14, 1939 |
| 2,211,242 | McIntosh | Aug. 13, 1940 |
| 2,226,852 | Dobrick | Dec. 31, 1940 |
| 2,277,410 | Neukirch | Mar. 24, 1942 |
| 2,370,089 | Swgers | Feb. 20, 1945 |
| 2,424,871 | Wenk | July 29, 1947 |

FOREIGN PATENTS

| Number | Country | Date |
|---|---|---|
| 8 | Great Britain | Jan. 2, 1856 |
| 16,041 | Great Britain | July 22, 1898 |
| 10,880 | Great Britain | Mar. 8, 1913 |
| 383,390 | Germany | Oct. 12, 1923 |

Certificate of Correction

Patent No. 2,563,088 August 7, 1951

KARL W. WILKS, Jr., ET AL.

It is hereby certified that error appears in the printed specification of the above numbered patent requiring correction as follows:

Column 2, line 1, for "that is" read *that it*; line 14, for "flat 21" read *flat face 21*; line 33, after "body 20" insert *by*; column 4, line 72, for "joint" read *point*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*